United States Patent
Carney Landow

(10) Patent No.: US 10,735,984 B2
(45) Date of Patent: Aug. 4, 2020

(54) SYSTEMS AND METHODS FOR IDENTIFYING USER DENSITY FROM NETWORK DATA

(71) Applicant: DISH Network L.L.C., Englewood, CO (US)

(72) Inventor: Kate Megan Carney Landow, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/962,914

(22) Filed: Apr. 25, 2018

(65) Prior Publication Data

US 2019/0208432 A1 Jul. 4, 2019

Related U.S. Application Data

(60) Provisional application No. 62/611,721, filed on Dec. 29, 2017.

(51) Int. Cl.
*H04W 24/08* (2009.01)
*H04W 12/02* (2009.01)
(Continued)

(52) U.S. Cl.
CPC ............ *H04W 24/08* (2013.01); *G08G 1/012* (2013.01); *G08G 1/0129* (2013.01);
(Continued)

(58) Field of Classification Search
None
See application file for complete search history.

(56) References Cited

U.S. PATENT DOCUMENTS

| 5,740,164 A | 4/1998 | Liron |
| 7,010,308 B2 | 3/2006 | Hendrey |

(Continued)

FOREIGN PATENT DOCUMENTS

| WO | 01/23835 A2 | 4/2001 |
| WO | 2016/169058 A1 | 10/2016 |

OTHER PUBLICATIONS

Panigrahi, Prashant, "5G the Real Answer for Internet of Things (IoT) Complexity—Why is LTE not Enough?" Mar. 10, 2015, 8 pages. Retrieved from http://www.3glteinfo.com/5g-for-internet-of-things/.

(Continued)

*Primary Examiner* — Ruihua Zhang
(74) *Attorney, Agent, or Firm* — Kilpatrick Townsend & Stockton LLP

(57) ABSTRACT

Systems and methods for identifying user density from network data are included herein. Embodiments include a communication tower that allocates communication bandwidth to devices in an area within range of the communication tower. The communication tower can calculate the user density in the area based on the allocation of bandwidth. Further, the types of data and messages exchanged with the devices can indicate the type of device, which can be used to group the devices based on type that are likely associated with a single user. For example, a single user may have a mobile phone, a tablet, and a smartwatch. Additionally, speed of devices can indicate which users are pedestrians. This information can be included in user density information and provided to devices or users to improve public safety, device response to high traffic areas, and so forth.

17 Claims, 5 Drawing Sheets

(51) Int. Cl.
  *H04W 28/20* (2009.01)
  *H04W 16/18* (2009.01)
  *H04L 12/24* (2006.01)
  *G08G 1/01* (2006.01)
  *G08G 1/08* (2006.01)
  *H04W 24/02* (2009.01)

(52) U.S. Cl.
  CPC ............ *G08G 1/0145* (2013.01); *G08G 1/08* (2013.01); *H04L 41/0896* (2013.01); *H04W 12/02* (2013.01); *H04W 16/18* (2013.01); *H04W 24/02* (2013.01); *H04W 28/20* (2013.01)

(56) References Cited

U.S. PATENT DOCUMENTS

| | | | |
|---|---|---|---|
| 8,612,136 | B2 | 12/2013 | Levine et al. |
| 9,622,133 | B1 | 4/2017 | Guvenc |
| 2005/0152280 | A1 | 7/2005 | Pollin et al. |
| 2009/0258658 | A1* | 10/2009 | Edge ............... G01S 5/0252 455/456.3 |
| 2013/0308521 | A1* | 11/2013 | Mikhail ............ H04W 72/085 370/315 |
| 2014/0249735 | A1 | 9/2014 | Levine et al. |
| 2015/0016561 | A1 | 1/2015 | Negus et al. |
| 2016/0007363 | A1* | 1/2016 | Hahn ................ H04W 72/04 370/252 |
| 2016/0037550 | A1* | 2/2016 | Barabell ............ H04B 17/318 455/450 |
| 2016/0055746 | A1* | 2/2016 | Taylor ............... G08G 1/087 340/906 |
| 2016/0277911 | A1 | 9/2016 | Kang et al. |
| 2017/0006429 | A1* | 1/2017 | Douglas ............ H04W 4/027 |
| 2018/0098289 | A1* | 4/2018 | Visotsky ........... H04W 16/28 |
| 2018/0167826 | A1* | 6/2018 | Sun .................. H04W 16/16 |
| 2018/0337928 | A1* | 11/2018 | Pelletier ........... H04L 63/102 |
| 2018/0365994 | A1* | 12/2018 | Song ................. G08G 1/0112 |

OTHER PUBLICATIONS

Notwell, Lindsay, "5G—Connection Density—Massive IoT and So Much More, 5G and Massive IoT will create a connected world," Nov. 2, 2017, 3 pages. Retrieved from https://www.cio.com/.../5g-connection-density-massive-iot-and-so-much-more.html.

Ge, Xiaohu & Tu, Song & Mao, Guogiang & Wang, Cheng-Xiang & Han, Tao. (2015). 5G Ultra-Dense Cellular Networks. IEEE Wireless Communications. 23. 10.1109/MWC.2016.7422408.

5G PPP White Paper on Automotive Vertical Sectors, Oct. 20, 2015, 67 pages.

Boccardi, et al., "Five Disruptive Technology Directions for 5G," IEEE Communications Magazine, vol. 52, Issue 2, Feb. 2014, 12 pages.

3GPP TR 23.703 v12.0.0 (Feb. 2014), $3^{rd}$ Generation Partnership Project; Technical Specification Group Services and System Aspects; Study on architecture enhancements to support Proximity-based Services (ProSe) (Release 12); 324 pages.

Han, et al., "Mobile Cloud Sensing, Big Data, and 5G Networks Make an Intelligent and Smart World," IEEE Network, Mar./Apr. 2015, 6 pages.

Sim, et al., "5G Millimeter-Wave and D2D Symbiosis: 60 GHz for Proximity-Based Services," IEEE Wireless Communications, Aug. 2017, 6 pages.

Ometov, et al., "Challenges and solutions for 5G proximity-based information exchange protocols," Laboratory for Advanced Research into Telecommunication Systems, Jul. 15, 2015, 2 pages.

Seif, et al., "Autonomous Driving in the iCity—HD Maps as a Key Challenge of the Automotive Industry," Elsevier vol. 2, Issue 2, Jun. 2016, 12 pages. Retrieved from https://www.sciencedirect.com/science/article/pii/S2095809916309432.

Wang, et al., "Cellular Architecture and Key Technologies for 5G Wireless Communication Networks," IEEE Communications Magazine, Feb. 2014, 9 pages.

Rost, et al., "Cloud Technologies for Flexible 5G Radio Access Networks," IEEE Communications Magazine, May 2014, 9 pages.

Hu, et al., "Mobile Edge Computing, A key technology towards 5G," ETSI White Paper No. 11, First edition—Sep. 2015, ISBN No. 979-10-92620-08-5, 16 pages.

Hossain, et al., "Evolution Towards 5G Multi-tier Cellular Wireless Networks: An Interference Management Perspective," arXiv:1401.5530v2 [cs.NI] Feb. 17, 2014, 10 pages.

Shields, Nicholas, "Here's how 5G will revoluntionize the Internet of Things," Business Insider, Jun. 15, 2017, 3 pages. Retrieved from: http://www.businessinsider.com/how-5g-will-revolutionize-the-internet-of-things-2017-6.

Meola, Andrew, "How the Internet of Things will affect security & privacy," Business Insider, Dec. 19, 2016, 4 pages. Retrieved from http://www.businessinsider.com/internet-or-things-security-privacy-2016-8?IR=T.

LTE to 5G: Cellular and Broadband Innovation White Paper, Rysavy Research for 5G Americas, Aug. 2017, 215 pages.

ProSe (Proximity Services) for LTE & 5G Networks: 2017 2030 Opportunities, Challenges, Strategies & Forecasts, Apr. 3, 2017, 6 pages. Retrieved from https://www.prnewswire.com/news-releases/prose-proximity-services-for-lte--5g-networks.

Alnatsheh, Rami, "Orchestrating the Performance of 5G," InfoVista, Johannesburg, Jul. 25, 2017, 26 pages. Retrieved from www.infovista.com.

Tracy, Phillip, "Sensor types and their IoT use cases," Big Data Analytics, Fundamentals, Internet of Things (IoT), Dec. 6, 2016, 4 pages. Retrieved from https://www.rcrwireless.com/20161206/internet-of-things/sensor-iot-tag31-tag99.

Lindeman, Tracey, "The 5G Network Probably Won't Be Good Enough for Self-Driving Cars," Dec. 13, 2017, Motherboard, pp. 1-6. Retrieved from https://motherboard.vice.com/en_us/article/qvzd3v/5g-network-wont-be-good-enough-for-autonomous-cars.

Tomas, Juan Pedro, "The most common types of sensors for IoT use cases," Apr. 25, 2017, Enterprise IoT Insights, 3 pages. Retrieved from https://enterpriseiotinsights.com.

Zaki, Maged, "The path to 5G: Paving the road to tomorrow's autonomous vehicles," Jun. 7, 2016, Qualcomm OnQ Blog, 6 pages.

Kaplan, Ken, "The plans for 5G to power the internet of things," Intel iQ, pp. 1-6. Retrieved from https://qz.com/179980/the-plans-for-5g-to-power-the-internet-of-things/ Accessed Dec. 8, 2017.

* cited by examiner

SYSTEMS AND METHODS FOR IDENTIFYING USER DENSITY FROM NETWORK DATA

CROSS-REFERENCES TO RELATED APPLICATIONS

This application claims priority to U.S. Provisional Patent Application No. 62/611,721, filed on Dec. 29, 2017, entitled "Systems And Methods For Identifying User Density From Network Data," the disclosure of which is hereby incorporated by reference in its entirety for all purposes.

BACKGROUND

Mobile phones and other mobile devices are ubiquitous. Today over 90% of Americans own a mobile phone. The communication networks supporting mobile phones are constantly changing and improving. Further, other devices are regularly developed that communicate over the communication networks. Despite the explosion in information and devices, the devices and mobile phones being serviced by communication networks do not know about or leverage information about other nearby devices.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for identifying user density from network data. The system can include a communication application executed by a communication server. The communication application can be configured to allocate cells of communication bandwidth to devices located in the area that is within range of the communication server. The communication application can also be configured to calculate a user density in the area based on the allocated cells of communication bandwidth and generate user density information based on the user density. The communication application can also be configured to transmit the user density information to a second application executing on a different computer system (e.g., a user application executing on a mobile device). Other embodiments of this aspect include corresponding computer systems, apparatus, and computer programs recorded on one or more computer storage devices, each configured to perform the actions of the methods.

Implementations may include one or more of the following features. Optionally, the communication application can be further configured to identify patterns in the user density for the area based on time of day or day of week. Optionally, the communication application can be further configured to identify a deviation from the patterns. Optionally, transmitting the user density information to the application executing on the computer system can include transmitting a notification to the computer system in response to identifying the deviation from the patterns. Optionally, determining the user density in the area based on the allocated cells of communication bandwidth can include calculating the number of cells that are allocated, and, for each cell that is allocated, identifying the type of each device using bandwidth in the cell. Optionally, the number of individual users can be determined based on the number of cells that are allocated and the type of each device using bandwidth in each cell. Optionally, determining the user density in the area based on the allocated cells of communication bandwidth can include identifying the number of pedestrians in the area based on the length of time the cell has been allocated. Optionally, when the number of pedestrians is above a threshold value, the user density information can include that the pedestrian density is high. Optionally, the different computer system can be configured to control a traffic signal. The second application can be configured to receive the user density information from the communication application and, in response to receiving the user density information indicating the pedestrian density is high, increase the length of the walk signal of the traffic signal. Optionally, the different computer system can be configured to control a self-driving vehicle. The second application can be configured to receive the user density information from the communication application and adjust the speed of the self-driving vehicle in response to receiving the user density information. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
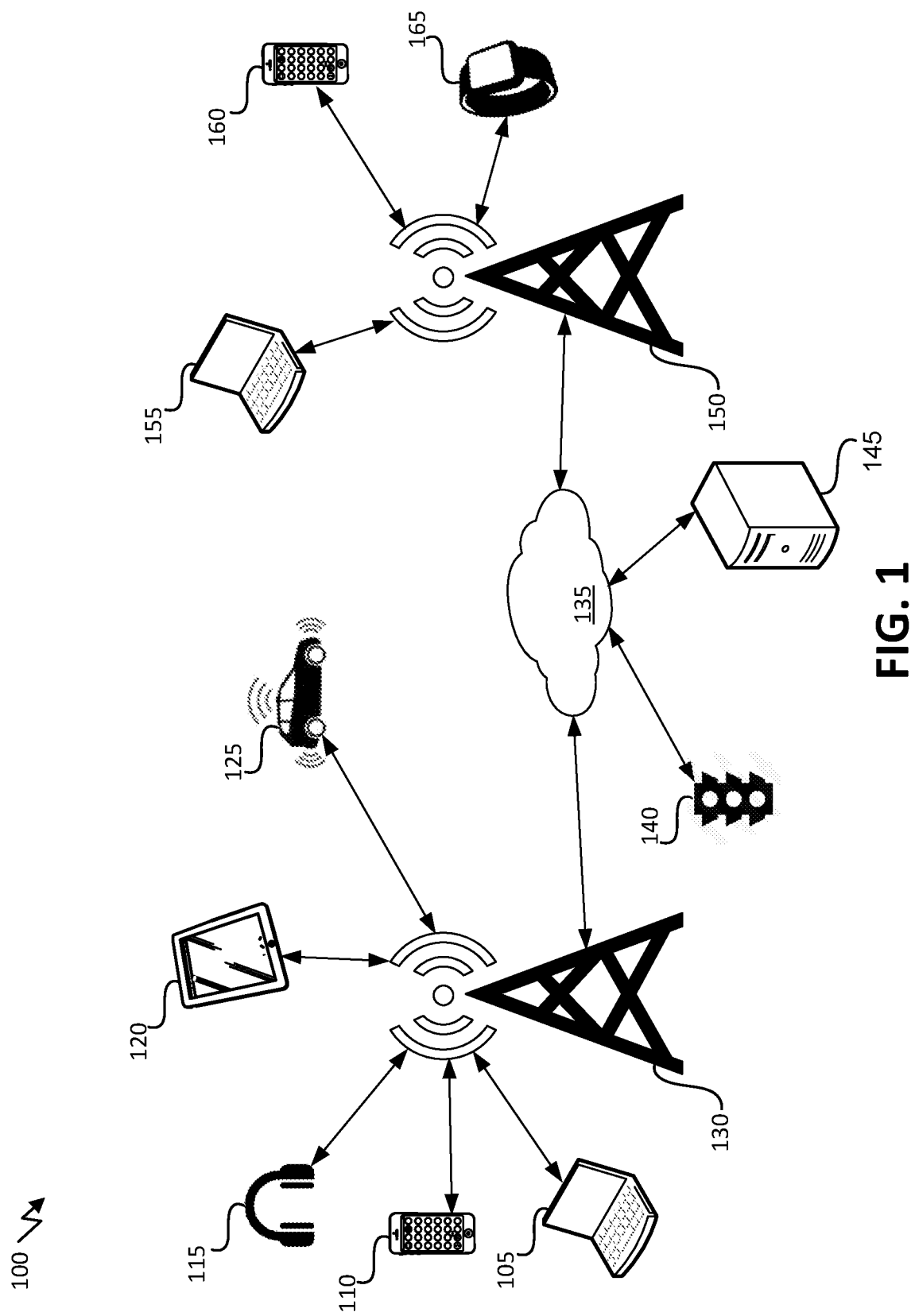
FIG. 1 illustrates a high level block diagram of an embodiment of a system for identifying user density from network data.

Communication networks, including advanced networks such as fifth generation broadband network technology (5G), have raw data about the user capacity and used capacity of the broadband network for any given communication tower. This raw data can be utilized to identify user density information for the area within range of the communication tower. The user density information can be useful for a number of other devices and organizations to know where there are a lot of people, pedestrians, traffic, and so forth. User density information can include, for example, the number of users in the area based on the number of devices connected to the network in that area. For example, self-driving cars can utilize the information as to upcoming vehicle and pedestrian traffic along the vehicle's route to adjust the speed of the vehicle. As another example, public safety organizations such as local police and fire departments as well as national safety organizations (e.g., FBI, CIA, and homeland security) can utilize the information to identify unexpected crowds. As yet another example, traffic signals can utilize the information to identify high numbers of pedestrians in an area and adjust or increase the length of the walk signals to accommodate the crowds.

Embodiments include a communication tower that allocates communication bandwidth to devices in an area within range of the communication tower. The communication tower can provide access to devices to a communication network. The communication network can be any suitable network including, for example, a 5G network, a cellular network, a wireless network, a wired network, and so forth. The communication tower can calculate the user density in the area based on the allocation of bandwidth. Based on the type of data and messages exchanged with any given device, information about the user can be estimated. For example, the types of data and messages can indicate the type of device. Further, algorithms can group the devices based on type that are likely associated with a single user. For example, a single user may have a mobile phone, a tablet, and a smartwatch. The algorithms can determine which devices likely belong to a single user to help avoid providing larger user density values than actually exist.

Embodiments can include algorithms for identifying patterns for an area. For example, the user density in a park can increase (e.g., by 20%) in the evening when users are home from work and go out to walk their dog. As another example, the user density in an area may decrease (e.g., to 5% of daytime values) at night when most people are home sleeping. As yet another example, the user density in a shopping area can increase (e.g., by 50%) on the weekends when users are off work enjoying their time. Based on the patterns, the algorithms can identify deviations from the patterns and optionally send an alert or notification. For example, if at night in an area the user density increases by 50% when it normally drops to 5% of daytime values, an alert can be transmitted to a local police department. The local police can use the information as needed. For example, if the change is unexpected, perhaps a patrol can be dispatched to investigate to ensure there is not a public safety issue. As another example, perhaps it is the $4^{th}$ of July and crowds are expected in the area to watch fireworks.

FIG. 1 illustrates an exemplary high level diagram of a system 100 for identifying user density from network data. The system 100 can include user devices including laptops 105 and 155, mobile phones 110 and 160, headphones 115, a tablet 120, a smart vehicle 125, and a smartwatch 165. The system 100 can also include a network 135, a computer system 145, communication towers 130 and 150, and traffic signal 140.

The user devices depicted in system 100 are examples of user devices. Laptops 105 and 155 can be any suitable laptop with networking capabilities for communicating over communication towers 130 and 150. Mobile phones 110 and 160 can be any suitable mobile phone including smartphones or non-smartphones with networking capabilities for communicating over communication towers 130 and 150. Headphones 115 can be wireless headphones that include networking capabilities for communicating over communication towers 130 and 150. Tablet 120 can be any suitable tablet computer including networking capabilities for communicating over communication towers 130 and 150. Self-driving vehicle 125 can be any suitable self-driving vehicle that includes networking capabilities for communicating over communication towers 130 and 150. Smartwatch 165 can represent any suitable wearable device that includes networking capabilities for communicating over communication towers 130 and 150. Though only one of each user device is depicted as communicating over each communication tower 130 and 150, any number of each of the user devices depicted can be included in system 100 on either communication tower 130 or 150. Further, other types of user devices, though not depicted, can be included in system 100. For example, other internet of things (TOT) devices, other wearable devices, or any other suitable, portable device with networking capabilities for communicating over communication towers 130 and 150 can be included in system 100.

Communication towers 130 and 150 can be any communication tower that allows the user devices to connect to network 135. Communication towers 130 and 150 can provide the user devices 105, 110, 115, 120, 125, 155, 160, and 165 access to a communication network or data network provided to mobile devices (e.g., 5G network, 4G LTE network, or any other suitable communication network). While only two communication towers 130 and 150 are depicted, there can be any number of communication towers 130 and 150.

Network 135 can be can be any type of network including the Internet, a local area network ("LAN"), a wide area network ("WAN"), a virtual network, a cloud network, or a telecommunications network. Network 135 can be implemented as a wired network and/or wireless network. Network 135 can be any suitable network for allowing communication between communication towers 130 and 150, traffic signal 140 and/or computer system 145.

Figure 5:
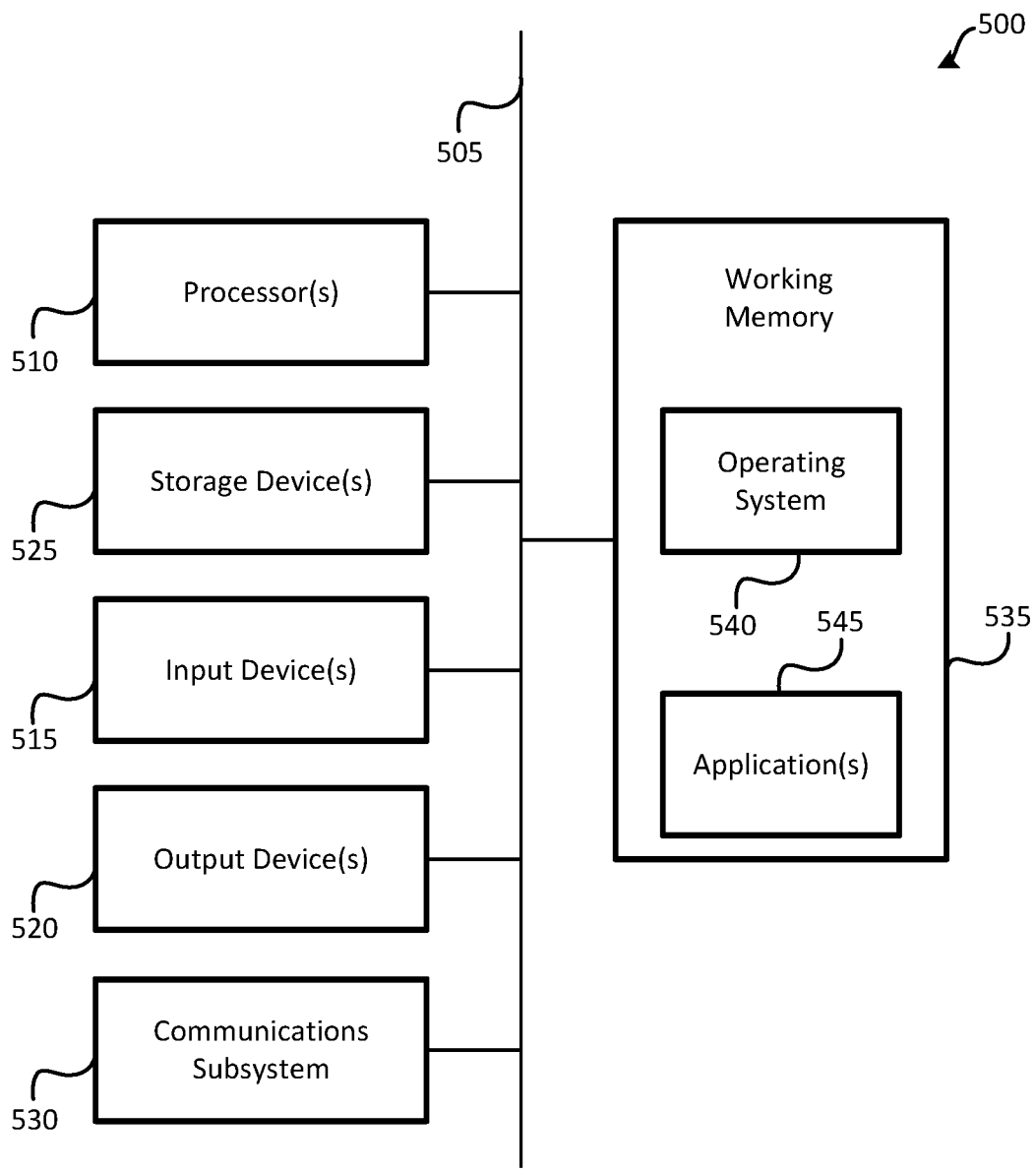
FIG. 5 illustrates an embodiment of a computer system.

Computer system 145 can be any suitable computer system, such as for example, computer system 500 of FIG. 5, which has components and processing capability to facilitate communication over network 135. Computer system 145 can be any computer system capable of receiving user density information from either communication tower 130 and/or 150. Computer system 145 can be, for example, a local police computer system configured to receive alerts from communication towers 130 and/or 150 regarding deviations from patterns in user density.

Traffic signal 140 can be any suitable traffic signal (or other device for which user density information can be utilized). The traffic signal 140 can include a processor and memory as described with respect to computer system 500 of FIG. 5. The traffic signal 140 can be configured to direct traffic at an intersection on a roadway. The traffic signal 140 can be configured to communicate over network 135 and receive user density information from communication towers 130 and/or 150. Traffic signal 140 can be configured to receive user density information from any communication tower 130 and 150 that is close to the geographic location of traffic signal 140 such that user density information from the communication tower 140 and 150 is relevant to the traffic signal 140. For example, the traffic signal 140 could be within a range of one or more communication towers 130 and 150. While only one traffic signal 140 is depicted, any number of traffic signals 140 can be included in system 100. Traffic signal 140 is depicted as being connected to communicate over network 135. Optionally, traffic signal 140 can communicate over communication tower 130 or 150.

In use, user devices 105, 110, 115, 120, and 125 can travel within range of communication tower 130, and user devices 155, 160, and 165 can travel within range of communication tower 150. As the user devices travel within range of a communication tower, the communication towers 130 and 150 can allocate cells of communication bandwidth to one or more devices. For example, a cell of communication bandwidth can be allocated to laptop 105 and mobile phone 110 jointly. As an alternative example, a cell of communication bandwidth can be allocated to laptop 105, and a cell of communication bandwidth can be allocated to mobile phone 110. The allocation of cells can be based on a configuration of the communication network. Optionally, based on the configuration of the communication network, the amount of bandwidth for each cell can be the same or can differ between cells. As user devices 105, 110, 115, 120, 125, 155, 160, and 165 leave the range of communication towers 130 and 150, the cells can be deallocated. Any suitable method of allocating cells can be used and is within the scope of the present disclosure.

Cellular towers 130 and 150 can use the raw data regarding the allocation and deallocation of cells to calculate a user density within the area of the range of the communication tower 130 and 150. For example, each communication tower 130 and 150 can count how many cells are allocated, which can be used to determine the user density in the area of the communication tower 130 and 150. Optionally, the communication towers 130 and 150 can identify patterns in the user density and deviations in the patterns of the user density. Optionally, the communication towers 130 and 150 can identify groups of devices that likely belong to a single user and adjust the user density to account for multiple devices indicating a single user rather than multiple users. Optionally, the communication towers 130 and 150 can identify users that are likely pedestrians based on, for example, the length of time the cell for the user's devices has been allocated.

Once the communication towers 130 and 150 calculate user density and generate other information about the user density (e.g., number of pedestrians, aggregate the information to avoid disclosing detailed information for security reasons, and so forth), the communication towers 130 and 150 can provide the user density information to one or more computer systems. For example, the communication towers 130 and 150 can transmit the user density information to one or more of the user devices. As an example, communication tower 130 can transmit the user density information to self-driving vehicle 125 (e.g., by broadcast to devices within range or in response to a request from self-driving vehicle 125), which can use the user density information for adjusting speed or other safety features of the self-driving vehicle 125. Further, self-driving vehicle 125 can request the user density information for the area within range of communication tower 150 because, for example, communication tower 150 is within the upcoming route of the self-driving vehicle 125.

Optionally, communication towers 130 and 150 can use the user density information to note deviations in patterns and alert devices or computer systems of the deviations. For example, communication tower 130 can determine there has been a deviation in pattern and send a notification to computer system 145. Computer system 145 can be, for example, a police department computer system. The alert can be used to dispatch a patrol unit to investigate the abnormal activity, for example. Alerts can be sent via any suitable means including, for example, by text message, by automated phone call, by email, by rich site summary (RSS) feed, and so forth.

Optionally, communication towers 130 and 150 can provide the user density information on request or periodically to traffic signal 140. Traffic signal 140 can use the user density information to modify the timing of the light, for example, to account for more or fewer pedestrians or account for heavier flows of traffic based on other communication tower 130 and 150 information. For example, traffic signal 140 can be within the area in range of communication tower 150 and to the east of communication tower 130. Heavy traffic identified in user density information for communication tower 130 can be provided to traffic signal 140. Increasing traffic can be identified in user density information for communication tower 150 and heavy pedestrian traffic can be identified in user density information for communication tower 150. Traffic signal 140 can use this information, for example, to infer that heavy traffic may be coming from the west. This information in conjunction with the user density information indicating heavy pedestrian traffic in the area can, for example, cause the traffic signal 140 to adjust the timing of the signal to increase the length of the walk signals and increase the length of the green light for east-bound traffic.

User density information in a network can raise privacy and security concerns. However, while the network may have the details of user density information available, the user density information may be aggregated and/or not provided to some applications to protect privacy and/or maintain security for a given area. For example, the user density information for a network can identify specific individuals in a given area at any given time. However, optionally, the user density information may not be provided at that level of detail. Providing such individual user details can raise privacy issues and concerns for individual users. However, individual user details can be provided if, for example, the individual user provides consent or other approval to disclose that user's detailed user density information prior to that user's user density specific and detailed data is provided. Optionally, the user density information can be aggregated such that individual privacy concerns and violations for given individual users are mitigated and/or eliminated. Specific user information can be obfuscated such that specific user details are not provided and/or aggregated user density information is provided. For example, rather than detailing the specific individual user information, the user density information can provide a number of users in a given area at a given time. As another example, more detailed information can be provided (e.g., the number of user's driving, the number of pedestrians, the number of user's utilizing more than one device, and so forth) and still aggregated so that specific user details are not provided. Providing even aggregated user density information can raise security concerns as well because the details of highly populated areas and when they are most busy can be used to create targets for terrorist activities and the like. To mitigate such security concerns, for example, details of user density information may be provided to, for example, systems such as traffic systems and self-driving cars, without making that user density information available to individuals. As another example, the user density information can be aggregated even further to simply provide, for example, "low," "medium," and "high" user density designations to given areas, and such designations can even be relative to that specific area (e.g., a downtown city area "high" designation can mean significantly higher user density than a rural town area "high" designation).

Figure 2:
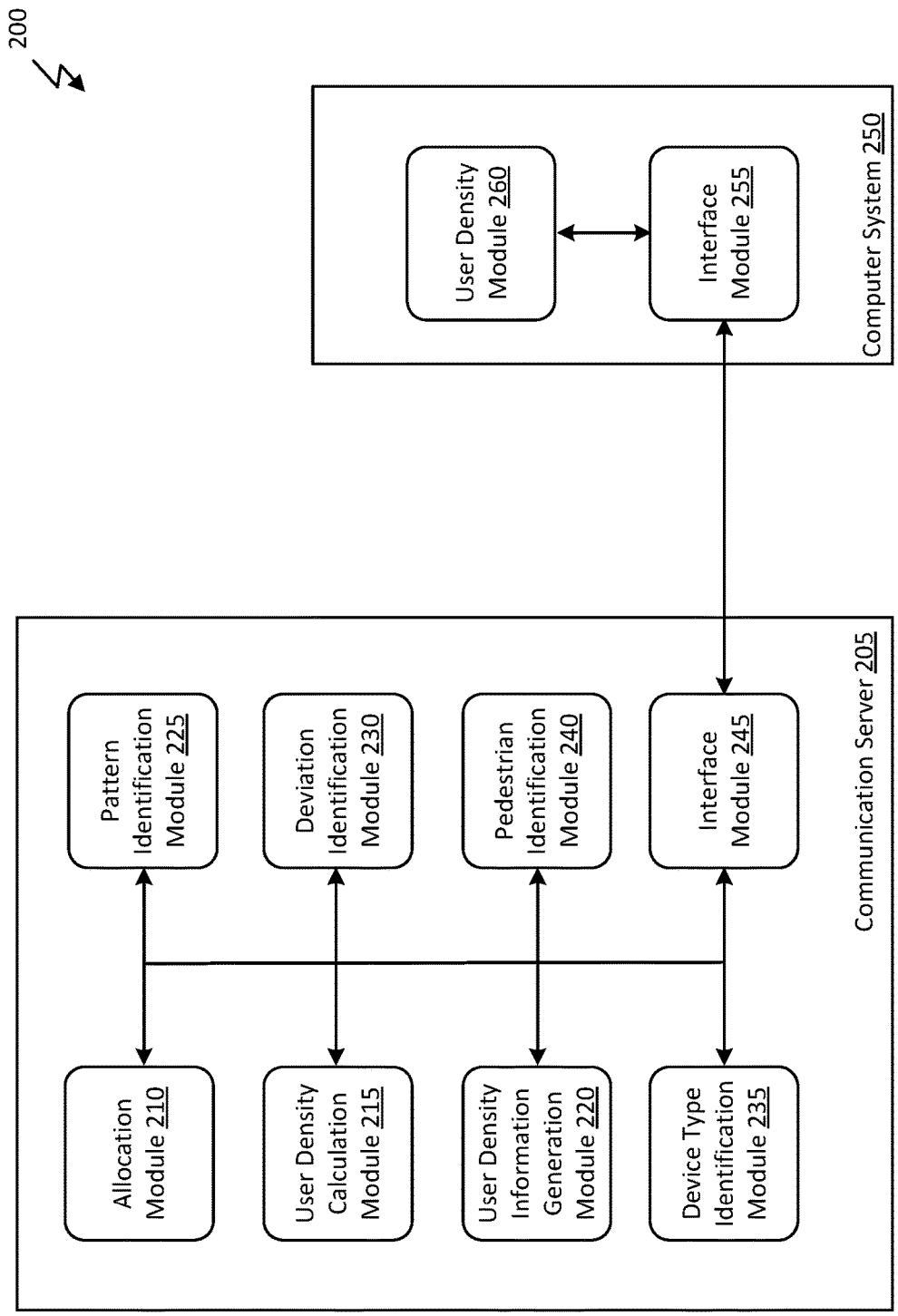
FIG. 2 illustrates an embodiment of a block diagram of a communication server and computer system for identifying user density from network data.

FIG. 2 illustrates an exemplary block diagram 200 of a communication server 205 and computer system 250 for identifying user density from network data. For simplicity of explanation, block diagram 200 includes only one communication server 205 and one computer system 250, though the system can include any number of communication servers 205 and any number of computer systems 250.

The communication server can be any suitable computer system, such as for example, computer system 500 of FIG. 5. The communication server can be a computer system used to control, for example, communication towers 130 and 140 of FIG. 1. Each communication tower can include a communication server 205 for allocation of communication bandwidth and calculation of user density. Alternatively, some or all of the functionality of communication server 205 can be performed on a cloud based hosting system or a central server for multiple communication towers. Communication server 205 can include an allocation module 210, a user density calculation module 215, user density information generation module 220, pattern identification module 225, deviation identification module 230, device type identification module 235, pedestrian identification module 240, and interface module 245. Even though for ease of description specific modules are described as having specific functionality, more or fewer modules can be used without affecting the scope of the present disclosure. Further, each of the modules 210, 215, 220, 225, 230, 235, 240, and 245 can communicate with each other module as shown in FIG. 2.

Allocation module 210 can receive an indication that a new device is within range of the communication server 205. Allocation module 210 can allocate a cell of communication bandwidth to the new device. A cell can be allocated using any method including, for example, allocation of communication bandwidth to a single device or allocation of a cell to multiple devices. Once the new device has a cell allocated, the new device can communicate on the communication network.

User density calculation module 215 can calculate the user density based on the number of allocated cells. For example, some networks can be configured to allocate one cell to each device. In such cases, a user density can be calculated based on the number of allocated cells. As another example, some networks can be configured to allocate one cell to a group of devices. Accordingly, a user density can be calculated based on the number of devices in each allocated cell. The calculation module 215 can calculate the user density by, for example, counting the amount of network traffic (e.g., counting bits of data or counting bytes of data), counting allocated cells, counting data bursts, counting the number of attempts to connect to the communication network, and so forth.

Device type identification module 235 can identify the type of each device communicating over the communication network that has been allocated communication bandwidth by communication server 205. For example, based on the number and type of messages being sent and received by the device, the device type identification module can determine whether the device is, for example, a smartphone, a tablet, or some other device. For example, devices that send and receive voice data can be identified as smartphones or mobile phones. As another example, the communication packets can indicate streaming video, indicating a tablet, laptop, or smartphone. Any type of data being transmitted can be identified by type including, for example, audio, video, and so forth. The type of data can indicate the type of device. The device type identification module 235 can also identify the type of port being used to transmit and receive data and/or identify the communication protocol being used to transmit and receive data to further define the type of data, which can be used to identify the type of device. As another example, the device type identification module 235 can use a physical device identifier (e.g., a MAC address) to determine the type of device. Once the device type identification module 235 identifies the types of the devices with allocated cells, the device type identification module 235 can use clustering for users to more accurately define the user density. Clustering the devices to identify or estimate multiple devices that belong to a single user can ensure that the user density is more accurate and not overestimating the number of users or density of users.

Pattern identification module 225 can identify patterns of activity. Pattern identification module 225 can identify patterns of activity based on allocation of cells to devices. For example, pattern identification module 225 can determine average cells allocated at times of day and/or days of the week. For example, average cell allocation during noon to 5 pm on weekdays can be 30% of the available communication bandwidth. As another example, average cell allocation on weekend daytime hours 8 am-5 pm can be 60% of available communication bandwidth. As another example, pattern identification module 225 can, upon analyzing user density for a park, determine that the busiest time is 4 pm-6 pm, which can correlate to the time of day when many users are out walking their dogs. Any suitable time frame and/or allocation values can be used.

Deviation identification module 230 can identify deviations from patterns identified by pattern identification module 225. Deviation identification module 230 can include threshold values for identifying deviations. For example, the threshold value can be a percentage value such as 10% so that deviations of 10% of the expected values can be identified as deviations. In some embodiments, threshold values can be cell values that can be calculated based on the pattern values. Optionally, deviation identification module 230 can identify an increase in actual traffic on the communication network as a deviation. Optionally, deviation identification module 230 can identify an increase in attempts to connect to the communication network as a deviation. Optionally, deviation identification module 230 can identify an increase in pings on the communication tower that exceed a baseline as a deviation. In some embodiments, deviations from pattern values that are identified can trigger an alert to be sent to, for example, public safety officials or other subscribers.

Pedestrian identification module 240 can identify the number of pedestrians in the area within the range of the communication server 205. For example, the length of time a cell is allocated to a device can indicate that the user is a pedestrian. If the device has a cell allocated for a threshold period of time (e.g., 5 minutes), the pedestrian identification module 240 can identify the device as a pedestrian. As another example, most devices have location identification technology, which can allow the communication server 205 to identify the location of the device. The location information can be used to determine a speed of the device. Based on the speed of the device, the pedestrian identification module 240 can determine whether the device is a pedestrian's device or a device in a vehicle (e.g., a device travelling at 1 mile per hour (MPH) can be a pedestrian's device, a device travelling at 50 MPH may not be a pedestrian's device, and so forth).

Computer system 250 can be any computer system, such as computer system 500 of FIG. 5. Computer system 250 can be, for example, any of the devices 105, 110, 115, 120, 125, 155, 160, and 165 of FIG. 1. Computer system 250 can include interface module 255 and user density module 260.

Interface module 255 can facilitate communication between computer system 250 and communication server 205 via interface module 245. User density module 260 can process the user density information for computer system 250. For example, if computer system 250 is a traffic signal controller, the user density module 260 can use the user density information to adjust the length of a walk signal or a green light, for example. As another example, if computer system 250 controls a self-driving vehicle, user density module 260 can utilize the user density information to adjust the speed or other safety mechanisms of the self-driving vehicle in response to increased pedestrian or other traffic, for example. As yet another example, if computer system 250 is a public safety computer, user density module 260 can receive an alert provided by deviation identification module 230 indicating a deviation in pattern behavior for the communication server 205. The user density module 260 can then, for example, distribute the alert to the appropriate public safety officers.

In use, when a device comes within range of communication server 205, allocation module 210 can allocate a cell to the device. Upon request or periodically, for example, user density calculation module 215 can calculate the user density for the area within range of communication server 205. User density calculation module 215 can determine the user density by, for example, counting the number of allocated cells. Device type identification module 235 can optionally identify groups of devices that belong to a single user based on, for example, message type. Device type identification module 235 can provide the group information to user density calculation module 215, which can adjust the user density to account for multiple devices belonging to a single user.

Optionally, pattern identification module 225 can analyze the user density for the communication server 205 and identify patterns. For example historical user density can be analyzed to identify patterns for time of day or day of week. Deviation identification module 230 can compare the current user density from user density calculation module 215 (before and/or after adjusting the user density to account for multiple devices belonging to a single user) to expected values based on the identified patterns. If the user density exceeds a threshold tolerance from the expected value, deviation identification module 230 can identify the user density as a deviation. Upon identifying the deviation, the deviation identification module can log the deviation and can generate a notification to send through interface modules 245 and 255 to user density module 260. Upon receipt of the user density deviation notification, the user density module 260 can handle the alert by, for example, dispatching a patrol unit to the area within range of communication server 205 to investigate. As another example, user density module 260 can maintain a list of notification addresses for forwarding the notification to.

Pedestrian identification module 240 can optionally analyze the current user density to identify users that may be pedestrians. For example, devices that have had a cell allocated for a threshold period of time (indicating that the user associated with the device is moving slowly or not at all). As another example, location information associated with the device can be obtained over time to determine the speed the device is moving. If the device is moving sufficiently slowly, the device can be designated as a pedestrian device. The pedestrian identification module 240 can provide the pedestrian information to user density information generation module 220. The user density can be provided to the user density information generation module 220 from user density calculation module 215. User density information generation module 220 can generate user density information about the current user density of communication server 205. For example, user density values including, for example, a number of pedestrians, a number of devices, and/or a number of users associated with the devices can be included in the user density information. In some embodiments, the user density information can be aggregated to not provide specific numbers and instead provide "high," "medium," or "low" values. User density information generation module 220 can provide the user density information to the interface module 245 for distribution to the computer system 250, to any other device, and/or for broadcast.

Figure 3:
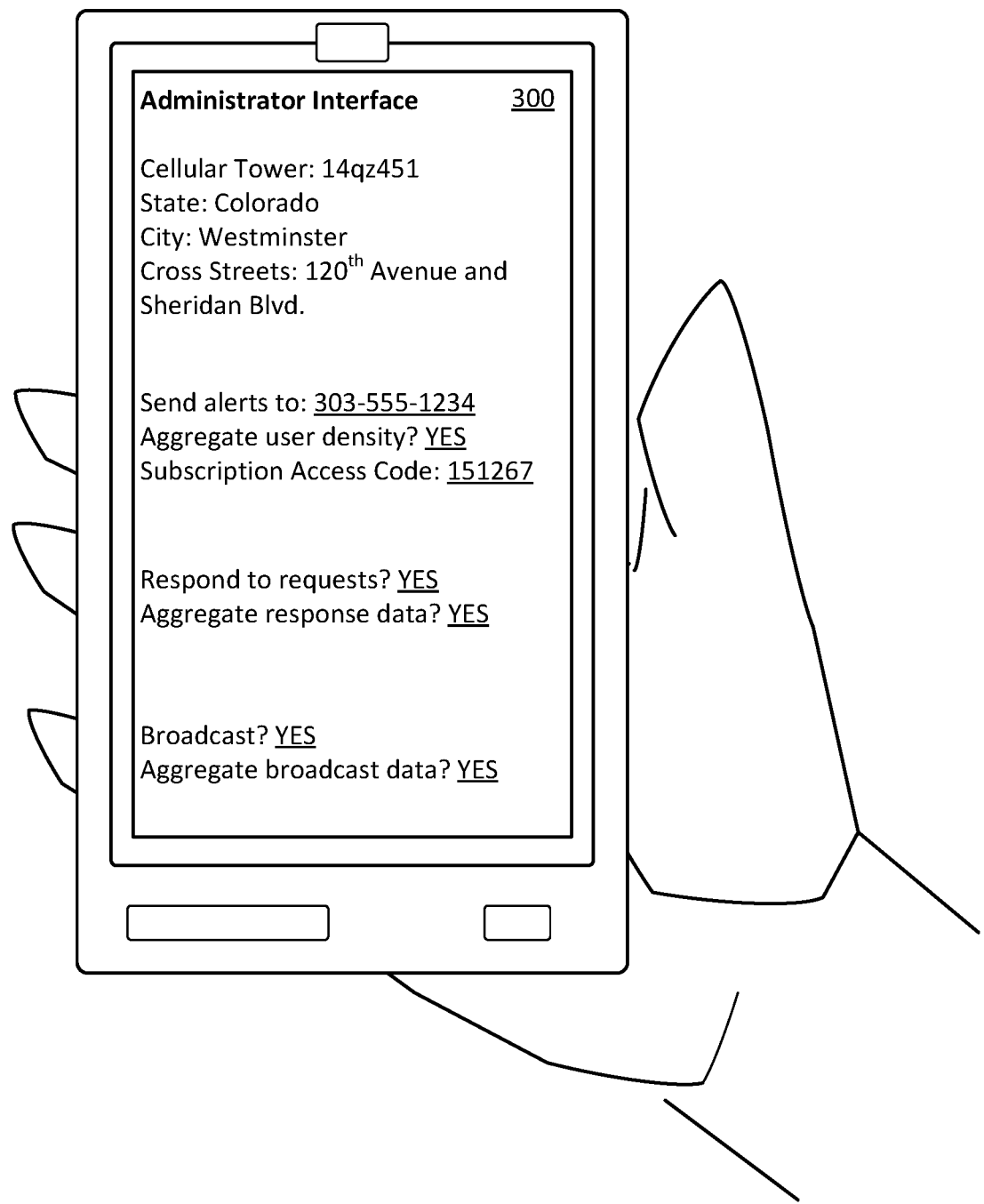
FIG. 3 illustrates an embodiment of a user interface for interfacing with a communication server for obtaining user density.

FIG. 3 illustrates an exemplary user interface 300 for interfacing with a communication server for obtaining user density. The user interface 300 can be, for example, an administrator user interface for configuring settings for the communication server. While shown on a smartphone, the user interface 300 can be accessible from any suitable computer system including, for example, directly on the communication server.

User interface 300 can include information for a communication tower (e.g., cellular tower 14qz451). The information can include the state, city, and cross streets closest to the communication tower. This information can help the user identify which communication tower the administration information applies. Further, this information can be included in an alert sent based on user density information that deviates from an expected value.

User interface 300 can include a telephone number to text, for example, when an alert issues. In some embodiments, the alerts can be sent to an email address. The phone number to which alerts should be sent can be modified in the administrator interface. As discussed above, the user density information can be aggregated to avoid giving precise values to avoid inadvertently providing information to unsavory individuals who may use the information for criminal activities. In some embodiments, a subscription access code can be generated to allow devices to subscribe to user density alerts, broadcast user density information, or to request user density information. The subscription access code can be a type of password that confirms the user has the authority to subscribe.

User interface 300 can include a toggle value for determining whether the communication tower should respond to requests for user density information. Rather than responding to requests, some communication servers can only send alerts and/or only broadcast the user density information. User interface 300 can further have a toggle value for determining whether to aggregate the response data.

User interface 300 can include a toggle value for determining whether to broadcast the user density information and a toggle value for determining whether to aggregate the broadcast data.

Security and privacy concerns can drive some decisions regarding whether to provide user density information in response to a request as well as whether options may or may not be available to receive user density information that is not aggregated. For example, user density information requests by individuals or certain types of systems can be denied to avoid security risks or privacy violations. If a system requesting the user density information is a traffic system, individuals are not likely going to view that information, making such distribution more secure from privacy and security concerns. However, a mobile device requesting user density information is likely to be seen by an individual, making such distributions more prone to risk. Optionally, user density information may always be aggregated to avoid privacy violations. Optionally, user density information may be highly generalized to avoid security risks. Various system configurations enforcing aggregation and limiting access to the details of user density information can ensure user privacy and avoid security risks.

Figure 4:
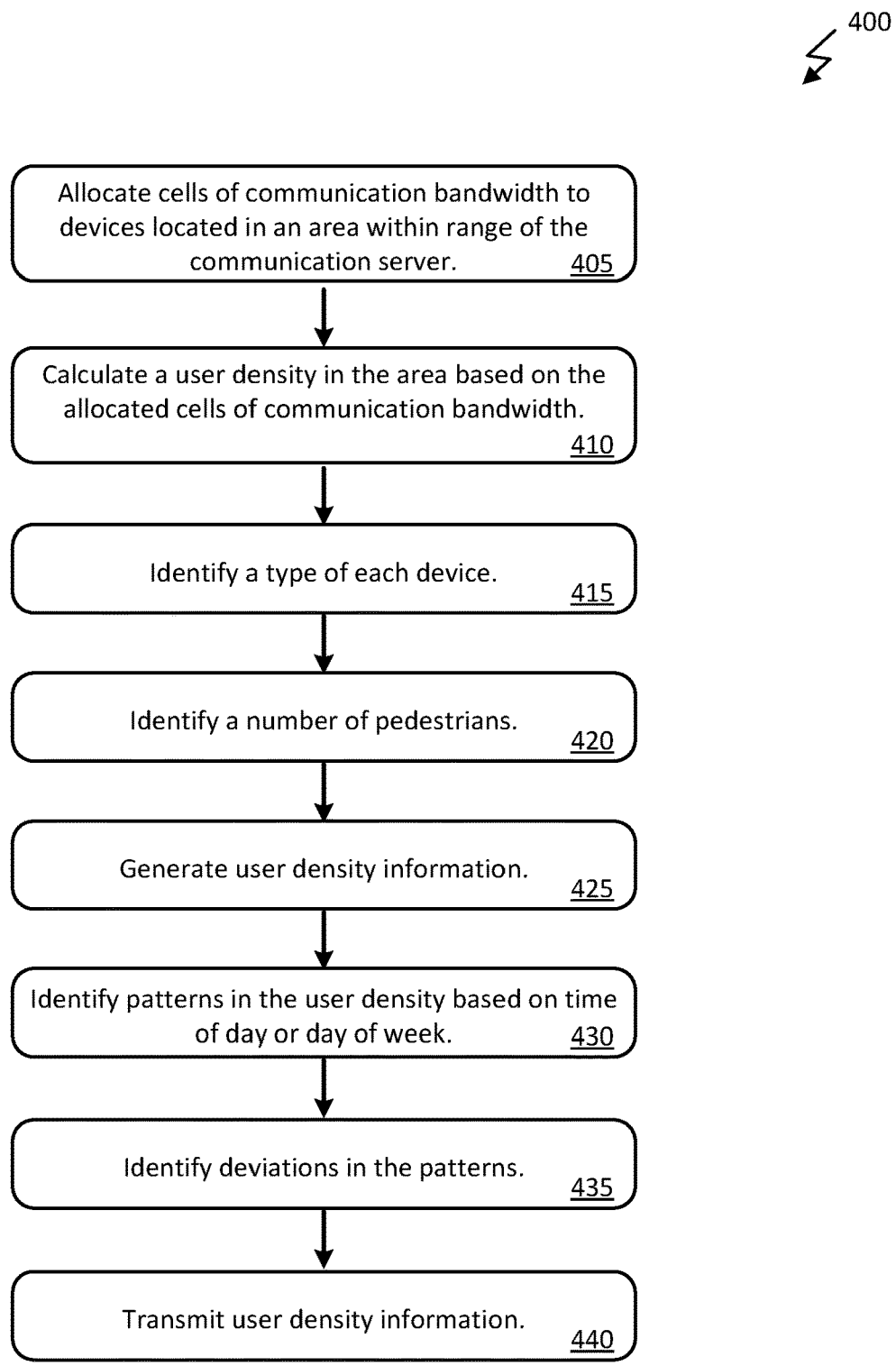
FIG. 4 illustrates an embodiment of a method for identifying user density from network data.

FIG. 4 illustrates an exemplary method 400 for identifying user density from network data. The method 400 can be performed by, for example, communication server 205 of FIG. 2.

The method 400 can begin at block 405 with the communication server allocating cells of communication bandwidth to devices located in an area within range of the communication server. For example, allocation module 210 as described with respect to FIG. 2 can allocate the cells. As new devices travel within range of the communication server, cells of communication bandwidth are allocated to the devices. Additionally, as devices leave the range, the device is deallocated so that the cell of communication bandwidth is freed for use by other devices.

At block 410, the communication server can calculate a user density in the area based on the allocated cells of communication bandwidth. For example, user density calculation module 215 as described with respect to FIG. 2 can calculate the user density. For example, the number of cells allocated can be counted to calculate a user density. At block 415, the communication server can identify a type of each device. For example, the device type identification module 235 as described with respect to FIG. 2 can identify the type of each device. Based on the type of each device, the communication server can determine whether more than one device belongs to a user to correct the user density to more accurately reflect the number of users within the range of the communication server. The type of the device can be determined by, for example, the type of messages flowing to and from the device.

At block 420, the communication server can identify a number of pedestrians in the area served by the communication server. For example, the pedestrian identification module 240 as described with respect to FIG. 2 can identify the pedestrians. For example, the cells allocated to various devices can be checked for a duration of allocation. If the cell has been allocated for longer than a threshold value of time, the communication server can infer that the user associated with the device is a pedestrian.

At block 425, the user density information can be generated. For example, the user density information generation module 220 as described with respect to FIG. 2 can generate the user density information. The user density information can include, for example, the number of devices, the number of allocated cells, the users associated with the devices, and/or the number of pedestrians. At block 430, the communication server can further review the user density information and/or the historical user density information to identify patterns in the user density based on time of day and/or day of week. For example, the pattern identification module 225 as described with respect to FIG. 2 can identify the patterns. At 435, communication server can identify deviations in the patterns. For example, the deviation identification module 230 as described with respect to FIG. 2 can identify the deviations. User density values that deviate by, for example, 15% can be identified as deviations. At block 440, the communication server can transmit the user density information and/or the alert to a user device or other device for use.

FIG. 5 illustrates an embodiment of a computer system 500. A computer system 500 as illustrated in FIG. 5 may be incorporated into devices such as a television receiver (e.g., host television receiver 105 of FIG. 1), DVR, television, media system, personal computer, and the like. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, a remote control, and/or the like; and one or more output devices 520, which can include without limitation a display device, a printer, and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, may be incorporated into the computer system 500 (e.g., an electronic device), as an input device 515. In many embodiments, the computer system 500 will further comprise a working memory 535, which can include a RAM or ROM device, as described above.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 525 described above. In some cases, the storage medium might be incorporated within a computer system, such as computer system 500. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received from the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system, comprising:
a communication server to communicate with a communication network that provides communication services to user devices, the communication server further to execute a communication application to:
allocate cells of communication bandwidth of the communication network to a plurality of the user devices located in a geographical area that is within range of the communication server;
determine numbers of users and locations of users located in the geographical area based on the allocated cells of communication bandwidth by:
calculating a number of cells that are allocated;
for each cell that is allocated, identifying respective device types for the plurality of the user devices using bandwidth in the cell;
clustering the plurality of the user devices by identifying or estimating sets of the user devices having different respective devices types and belonging to a same user; and
determining the numbers of users based on the number of cells that are allocated and the clustering, such that the numbers of users in the cells is smaller than a number of user devices determined to be using bandwidth in the cells;
calculate present user density information in the geographical area based on the numbers and locations of the users;
identify a pattern deviation in the present user density information according to historical user density information; and
transmit the present user density information to an application executing on a computer system, responsive to detecting the pattern deviation.

2. The system of claim 1, wherein the communication application is to:
identify the pattern deviation in the present user density information for the geographical area based on at least one of time of day or day of week.

3. The system of claim 1, wherein the communication application is to:
transmit the present user density information to the application executing on the computer system by transmitting a notification to the computer system that indicates the pattern deviation.

4. The system of claim 1, wherein:
the communication application is to determine the numbers and locations of the users located in the geographical area based on the allocated cells of communication bandwidth further by:
calculating a number of cells that are allocated; and
for each cell that is allocated, identifying a number of pedestrians in the geographical area based on a length of time the cell has been allocated; and
the communication application is to calculate the present user density information by:
determining whether the number of pedestrians is above a threshold value; and
in response to determining the number of pedestrians is above the threshold value, including in the present user density information that a pedestrian density is high.

5. The system of claim 4, wherein:
the application executing on the computer system is configured to control a traffic signal; and
the communication application is to transmit the present user density information to the application executing on the computer system, in response to the pattern deviation indicating the pedestrian density is high, so as to increase a length of a walk signal of the traffic signal.

6. The system of claim 1, further comprising:
the application executing on the computer system is configured to control a self-driving vehicle; and
the communication application is to transmit the present user density information to the application executing on the computer system so as to adjust a speed of the self-driving vehicle in accordance with the user density information.

7. The system of claim 1, wherein the user density information comprises an aggregated user density that obfuscates specific user information.

8. A non-transient computer readable memory device having stored thereon instructions that, when executed by a processor, cause the processor to:
allocate cells of communication bandwidth to a plurality of devices located in a geographical area that is within range of a communication server;
determine numbers of users and locations of users located in the geographical area based on the allocated cells of communication bandwidth by:
calculating a number of cells that are allocated;
for each cell that is allocated, identifying respective device types for the plurality of the user devices using bandwidth in the cell;
clustering the plurality of the user devices by identifying or estimating sets of the user devices having different respective devices types and belonging to a same user; and
determining the numbers of users based on the number of cells that are allocated and the clustering, such that the numbers of users in the cells is smaller than a number of user devices determined to be using bandwidth in the cells;
calculate present user density information in the geographical area based on the numbers and locations of the users;
identify a pattern deviation in the present user density information according to historical user density information; and
transmit the present user density information to an application executing on a computer system, responsive to detecting the pattern deviation.

9. The non-transient computer readable memory device of claim 8, wherein the instructions, when executed by the processor, cause the processor to:
identify the pattern deviation based on at least one of time of day and day of week.

10. The non-transient computer readable memory device of claim 8, wherein the instructions, when executed by the processor, cause the processor to:
transmit the present user density information to include a notification to the computer system indicating the pattern deviation.

11. The non-transient computer readable memory device of claim 8, wherein the instructions, when executed by the processor, cause the processor to:
determine the numbers and locations of the users further by:
calculating a number of cells that are allocated; and
for each cell that is allocated, identifying a number of pedestrians in the geographical area based on a length of time the cell has been allocated; and
calculate the present user density information by:
determining whether the number of pedestrians is above a threshold value; and
in response to determining the number of pedestrians is above the threshold value, including in the present user density information that a pedestrian density is high.

12. The non-transient computer readable memory device of claim 11, wherein:
the application executing on the computer system is configured to control a traffic signal; and
in response to the present user density information indicating the pedestrian density is high, the instructions, when executed by the processor, cause the processor to transmit the present user density information so as to increase a length of a walk signal of the traffic signal.

13. The non-transient computer readable memory device of claim 8, wherein:
the application executing on the computer system is configured to control a self-driving vehicle; and
the instructions, when executed by the processor, cause the processor to transmit the present user density information so as to adjust a speed of the self-driving vehicle in accordance with the user density information.

14. A method, comprising:
allocating cells of communication bandwidth to a plurality of devices located in a geographical area that is within range of a communication server;
determining numbers of users and locations of users located in the geographical area based on the allocated cells of communication bandwidth by:
calculating a number of cells that are allocated;
for each cell that is allocated, identifying respective device types for the plurality of the user devices using bandwidth in the cell;
clustering the plurality of the user devices by identifying or estimating sets of the user devices having different respective devices types and belonging to a same user; and
determining the numbers of users based on the number of cells that are allocated and the clustering, such that the numbers of users in the cells is smaller than a number of user devices determined to be using bandwidth in the cells;
calculating present user density information in the geographical area based on the numbers and locations of users;
identifying a pattern deviation in the present user density information according to historical user density information;
transmitting the present user density information to an application executing on a computer system, responsive to detecting the pattern deviation.

15. The method of claim 14, wherein transmitting the present user density information to the application executing on the computer system comprises transmitting a notification to the computer system indicating the pattern deviation.

16. The method of claim 14, wherein
determining the numbers and locations of the users further comprises:
calculating a number of cells that are allocated; and
for each cell that is allocated, identifying a number of pedestrians in the geographical area based on a length of time the cell has been allocated;
calculating the present user density information comprises:
determining whether the number of pedestrians is above a threshold value; and
in response to determining the number of pedestrians is above the threshold value, including in the user density information that a pedestrian density is high;
the application executing on the computer system is configured to control a traffic signal; and
the transmitting is, in response to the present user density information indicating the pedestrian density is high, so as to increase a length of a walk signal of the traffic signal.

17. The method of claim 14, wherein:
the application executing on the computer system is configured to control a self-driving vehicle; and
the transmitting is so as to adjust a speed of the self-driving vehicle in accordance with the present user density information.

* * * * *